United States Patent
Jander et al.

(10) Patent No.: US 12,107,637 B2
(45) Date of Patent: Oct. 1, 2024

(54) TERMINAL LINE INTERFACE MODULE FOR UNDERSEA OPEN CABLE SYSTEM ACCESS

(71) Applicant: SUBCOM, LLC, Eatontown, NJ (US)

(72) Inventors: Ralph Brian Jander, Freehold, NJ (US); Miguel Rodriguez, Jackson, NJ (US)

(73) Assignee: SubCom, LLC, Eatontown, NJ (US)

( * ) Notice: Subject to any disclaimer, the term of this patent is extended or adjusted under 35 U.S.C. 154(b) by 374 days.

(21) Appl. No.: 17/554,035

(22) Filed: Dec. 17, 2021

(65) Prior Publication Data
US 2022/0216925 A1    Jul. 7, 2022

Related U.S. Application Data

(60) Provisional application No. 63/138,650, filed on Jan. 18, 2021, provisional application No. 63/134,814, filed on Jan. 7, 2021.

(51) Int. Cl.
| | | |
|---|---|---|
| *H04B 10/80* | (2013.01) | |
| *H04B 10/40* | (2013.01) | |
| *H04B 10/50* | (2013.01) | |
| *H04B 10/60* | (2013.01) | |
| *H04B 13/02* | (2006.01) | |

(52) U.S. Cl.
CPC ........... *H04B 13/02* (2013.01); *H04B 10/801* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 4,599,745 A | * | 7/1986 | Baran ................... | H04B 13/02 398/115 |
| 4,903,337 A | * | 2/1990 | Newell ................ | G02B 6/3574 398/141 |
| 6,166,836 A | * | 12/2000 | Crameri ................... | H04B 3/44 398/1 |

(Continued)

FOREIGN PATENT DOCUMENTS

WO    2006132927 A2    12/2006

OTHER PUBLICATIONS

Tsai "Analysis and Design of Bandpass Single-Pole-Double-Throw FET Filter-Integrated Switches" IEEE Transactions on Microwave Theory and Techniques, vol. 55, No. 8, pp. 1601-1610, Aug. 2007 (Year: 2007).*

(Continued)

*Primary Examiner* — Darren E Wolf
(74) *Attorney, Agent, or Firm* — KDW Firm PLLC

(57) ABSTRACT

An apparatus for managing optical subsea communications system may include a plurality of fiber interface modules (FIM), wherein a given FIM comprises a receive part, and a transmit part. The transmit part may include two normally closed switches, wherein a first switch of the two normally closed switches is coupled to a line monitoring equipment (LME) TX port, and wherein a second switch of the two normally closed switches is coupled to a line terminating equipment (LTE) TX port.

20 Claims, 9 Drawing Sheets

(56) References Cited

U.S. PATENT DOCUMENTS

2004/0096215 A1* 5/2004 Evangelides, Jr. .. H04B 10/075
398/33

OTHER PUBLICATIONS

European Extended Search Report dated Jun. 2, 2022, for the EP Patent Application No. 21218335.4 filed on Jan. 7, 2021, 10 pages.
Rivera Elizabeth et al : "Subsea Open Cables: A Practi cal Perspective on the Guideli nes and Gotchas" , Apr. 7, 2019 (Apr. 7, 2019), XP055925326, URL: https : //web.asn.com/medi a/data/files_user/72/SDMI/How_to_Open_Cable_The_Guidelines_and_the_Gotchas_-_04-07-2019_RI.pdf, [retrieved on May 25, 2022].
Gaudette Jamie et al: "Open undersea cable systems for cloud scale operation" , 2017 Optical Fiber Communications Conference and Exhibition (OFC), OSA, Mar. 19, 2017 (Mar. 19, 2017) , pp. 1-3, XP033100804, DOI : 10 . 1364/OFC . 2017.M2E.I, [retrieved on May 31, 2017].
Hartling Elizabeth Rivera : "From the Acceptance of Turnkey Systems to Open Networks with G-SNR", 2020 Optical Fiber Communications Conference and Exhibition (OFC), OSA, Mar. 8, 2020, (Mar. 8, 2020), pp. 1-28, XP033767500, DOI: 10.1364/0FC. 2020.WIJ.4, [retrieved on Apr. 30, 2020].

* cited by examiner

TERMINAL LINE INTERFACE MODULE FOR UNDERSEA OPEN CABLE SYSTEM ACCESS

RELATED APPLICATIONS

This application claims priority to U.S. Provisional application Ser. No. 63/138,650, entitled TERMINAL LINE INTERFACE MODULE FOR UNDERSEA OPEN CABLE SYSTEM ACCESS, filed Jan. 18, 2021, and U.S. Provisional application Ser. No. 63/134,814, entitled TERMINAL LINE INTERFACE MODULE FOR UNDERSEA OPEN CABLE SYSTEM ACCESS, filed Jan. 7, 2021, both of which applications are incorporated by reference herein in their entirety.

BACKGROUND

Field of the Invention

Embodiments of the present disclosure relate to the field of optical communication systems. More particularly, the present disclosure relates to a terminal line interface module for at least undersea open cable system access.

Discussion of Related Art

Long-haul optical communication systems, such as submarine optical communication systems, may include numerous interconnected optical cables to facilitate the communication of data and information. The optical cables may be trunk cables and may include bi-directional trunk fiber pairs.

Undersea optical communication systems may include "wet plant" and "dry plant" portions. The wet plant portion of the system may include everything that may be underwater, such as the submarine cable, submerged repeaters or amplifiers, branching units, etc. The dry plant portion may include equipment that may be deployed in cable landing stations, such as submarine line terminal equipment (SLTE), power feed equipment (PFE), line monitoring

BRIEF SUMMARY

In one embodiment, an apparatus is provided for managing optical subsea communications system. The apparatus may include a plurality of fiber interface modules (FIM), wherein a given FIM comprises a receive part, and a transmit part. The transmit part may include two normally closed switches, wherein a first switch of the two normally closed switches is coupled to a line monitoring equipment (LME) TX port, and wherein a second switch of the two normally closed switches is coupled to a line terminating equipment (LTE) TX port.

In another embodiment, a subsea communications system is provided, including a wet plant; and an interface module assembly, coupled to the wet plant. The interface module assembly may include a plurality of fiber interface modules (FIM), wherein a given FIM comprises a receive part; and a transmit part, wherein the transmit part comprises two normally closed switches. As such a first switch of the two normally closed switches may be coupled to a line monitoring equipment (LME) TX port, and wherein a second switch of the two normally closed switches is coupled to a line terminating equipment (LTE) TX port In another embodiment, a subsea communications system is provided, including a wet plant; and an interface module assembly, coupled to the wet plant. The interface module assembly may include a plurality of fiber interface modules (FIM), wherein a given FIM comprises a receive part; and a transmit part. The transmit part may have two normally closed switches, wherein a first switch of the two normally closed switches is coupled to a line monitoring equipment (LME) TX port, and wherein a second switch of the two normally closed switches is coupled to a line terminating equipment (LTE) TX port. The given FIM may also include at least one amplifier, coupled between to a port of the given FIM.

DESCRIPTION OF EMBODIMENTS

Figure 1:
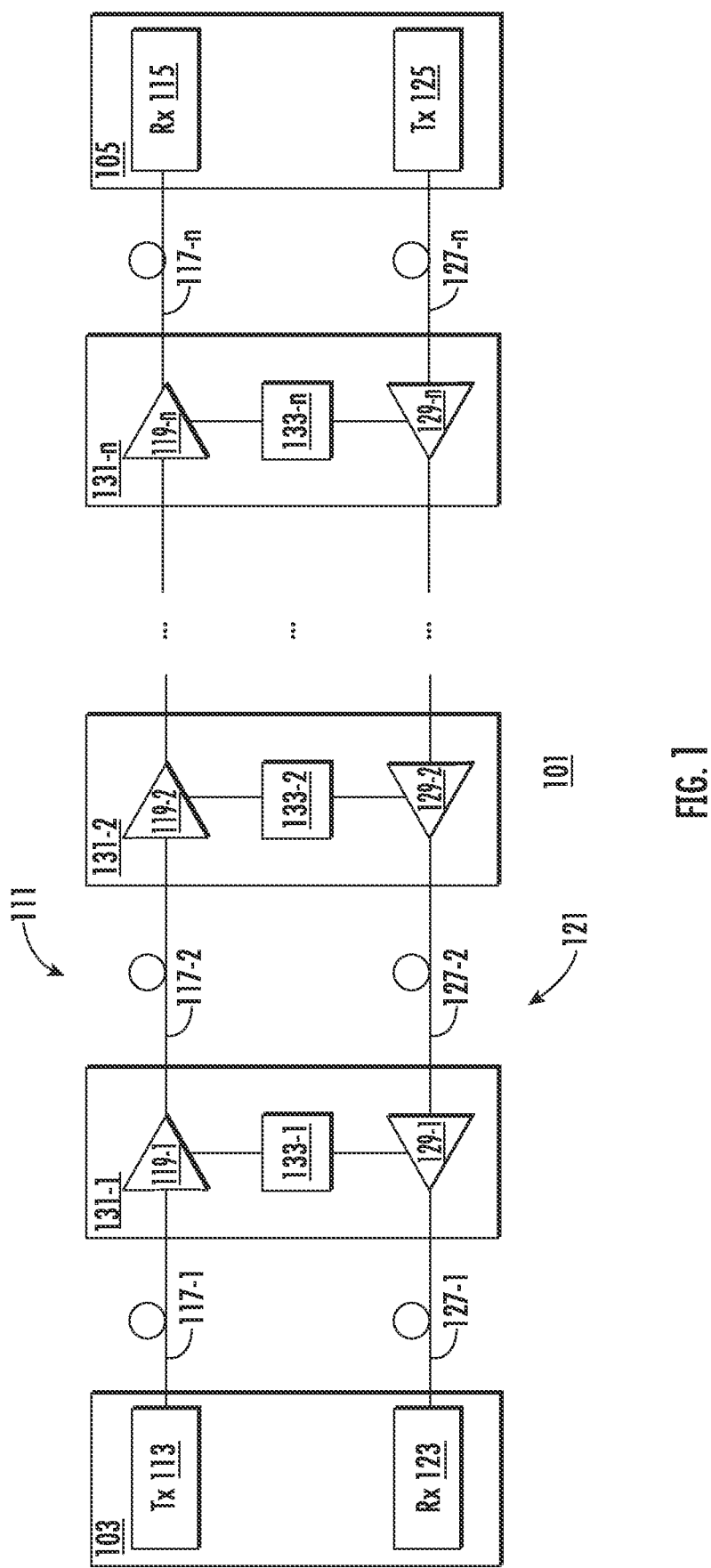
FIG. 1 illustrates an example optical communication system.

The present embodiments is directed to at least a terminal line interface module for undersea open cable system access. According to embodiments and as will be further described in detail below, each module may service one fiber pair and may contain at least two highly reliable and normally closed switches. For example, the switching capability may accommodate both dark and lit fiber pair reconfiguration and allow for optical time-domain reflectometer (OTDR) measurements once a fiber pair is lit.

The present embodiments will now be described more fully hereinafter with reference to the accompanying drawings, in which various embodiments are shown. The subject matter of this disclosure, however, may be embodied in many different forms and should not be construed as limited to the embodiments set forth herein. Rather, these embodiments are provided so that this disclosure will be thorough and complete, and will fully convey the scope of the inventive concept to those skilled in the art. In the drawings, like numbers refer to like elements throughout.

Referring to the drawings, FIG. 1 illustrates an exemplary bi-directional optical communication system, simply termed an optical communication system 101, which system may use high-bandwidth fiber optics to transmit vast amounts of data over long distances. Bi-directional data transmission may be implemented by constructing pairs of optical fibers within the optical cable and transmitting one or more channels, e.g., wavelength division multiplexed channels, per fiber pair.

As shown, the optical communication system 101 may include terminals 103 and 105 connected by two unidirectional optical paths 111, 121, which together form a bi-directional optical fiber pair. Optical path 111 may transmit information in one direction (e.g., to the right) from a transmitter 113 at terminal 103 to a receiver 115 at terminal 105. Optical path 121 may transmit information in the other direction (e.g., to the left) from a transmitter 125 at terminal 105 to a receiver 123 at terminal 103.

With respect to terminal 103, the optical path 111 is an outbound path and the optical path 121 is an inbound path. The optical path 111 may include optical fibers 117-1 to 117-$n$ and optical amplifiers 119-1 to 119-$n$, and the optical path 121 may include optical fibers 127-1 to 127-$n$ and optical amplifiers 129-1 to 129-$n$. The one or more of the optical amplifiers 119-1 to 119-$n$ and 129-1 to 129-$n$ may be EDFAs. It may be understood that, in some examples, transmitter 113 and receiver 123 may be housed together as a transponder at terminal 103, and similarly, transmitter 115 and receiver 125 may also be housed together as a transponder at terminal 105.

The optical path pair (e.g., optical paths 111, 121) may be configured as a set of amplifier pairs 119-1 to 119-$n$ and 129-1 to 129-$n$ within repeaters 131-1 to 131-$n$ connected by pairs of optical fibers 117-1 to 117-$n$ and 127-1 to 127-$n$, which may be included in an optical fiber cable together with fibers supporting additional path pairs. Each repeater 131 may include a pair of amplifiers 119, 129 for each path pair and may include additional amplifiers for additional path pairs. The optical amplifiers 119, 129 may utilize EDFAs or other rare earth doped fiber amplifiers, Raman amplifiers, or semiconductor optical amplifiers (SOAs). A coupling path 133-1 to 133-$n$ may be coupled between optical paths 111, 121, for example, in one or more of the repeaters 131-1 to 131-$n$. It may be understood that the term "couple" or "coupled," as used herein, broadly refers to any connection, connecting, coupling, link, or linking, either a direct or indirect or a wired or wireless connection and does not necessarily imply that the coupled components or elements are directly connected to each other.

Although an exemplary embodiment of the optical communication system 101 is shown and described, variations of the optical communication system 101 are within the scope of the present disclosure. The optical communication system 101 may include, for example, more optical path pairs and more or fewer repeaters. Alternatively, the optical communication system 101 may not include any optical amplifiers or may include, instead of optical amplifiers, optical pump power sources suitable for implementing optical gain by Raman amplification within optical fibers connecting repeaters.

Moreover, it may be understood that the transmitters, receivers, transponders containing the transmitters and receivers, or any other suitable device for transmitting and receiving data, may be include at least one memory and one or more processors (e.g., CPU, ASIC, FGPA, any conventional processor, etc.) to execute instructions stored in memory. It may further be understood that the above-described optical paths may be powered via power conductor(s) of the optical cables. Moreover, multiple optical communication systems, such as optical communication system 101, may be interconnected via interconnect cables and branching units.

Note that Line Monitoring Equipment (LME) and Command Response Equipment (CRE) were formerly designed or configured assuming Terminal Line Amplifiers (TLAs) were always available at the interface to the wet plant for lit fiber pairs. Equipment such as a Monitor Interface Passive Device Pack (MI-PDP), and more recently the Common Optics Unit (COU), may be examples of passive optical packs that provide all the optical interconnections for the LME and CRE with each fiber pair so that LME and CRE signals can access the wet plant fiber pair(s). It may be understood that a "dark" fiber or dark fiber pair(s), as used herein, broadly refers to unused optical fiber(s) available for use in an optical communication system. Conversely, it may be understood that a "lit" fiber or lit fiber pair, as used herein, broadly refers to optical fiber(s) in use and may be actively sending or receiving data via light or light wavelengths.

In examples, for lit fiber pairs, (i) a generic terminal equipment may connect to the Submarine Line Terminating Equipment (SLTE) side of the MI-PDP or COU, (ii) the LME and CRE may connect to LME and CRE optical ports, and (iii) two terminal optical amplifiers may be connected to appropriate ports of the MI-PDP or COU. For instance, this arrangement provides the desired gain for both SLTE data channels and the inbound and outbound LME and CRE signals.

Figure 2:
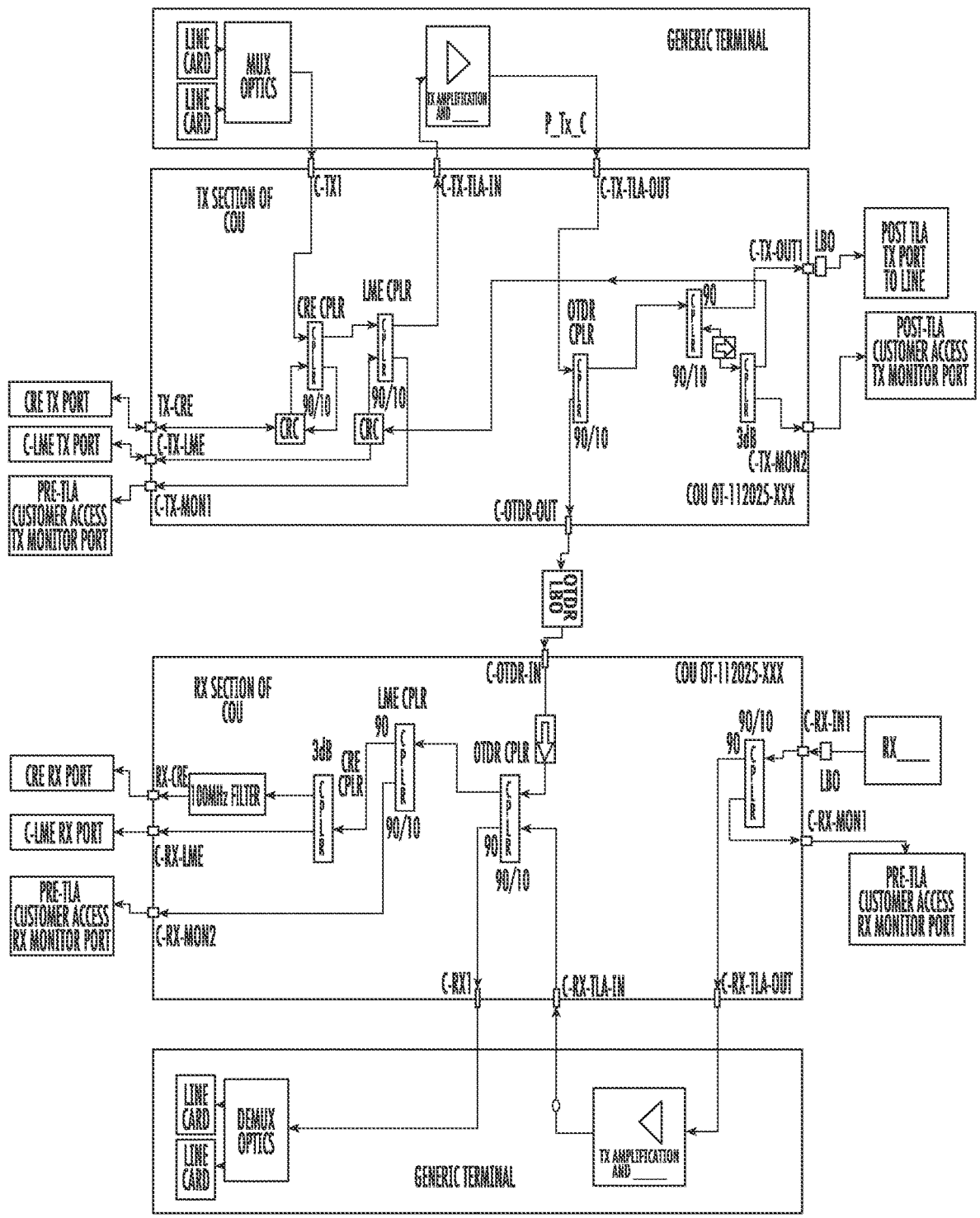
FIG. 2 illustrates a first example optical interconnection with a wet plant.

FIG. 2 illustrates an example optical interconnection 200 with a wet plant. The optical interconnection 200 may be a typical optical configuration for SLTE, LME and CRE optical interconnection with the wet plant, where the terminal amplifiers may provide anywhere between 14.5 and 23.5 dB of gain. As shown in FIG. 2, a first generic terminal (illustrated top terminal) may be coupled to a transmission or transmitter ("TX") section of the COU and a second generic terminal (illustrated bottom terminal) may be coupled to a receiving or receiver ("RX") section of the COU.

Figure 3:
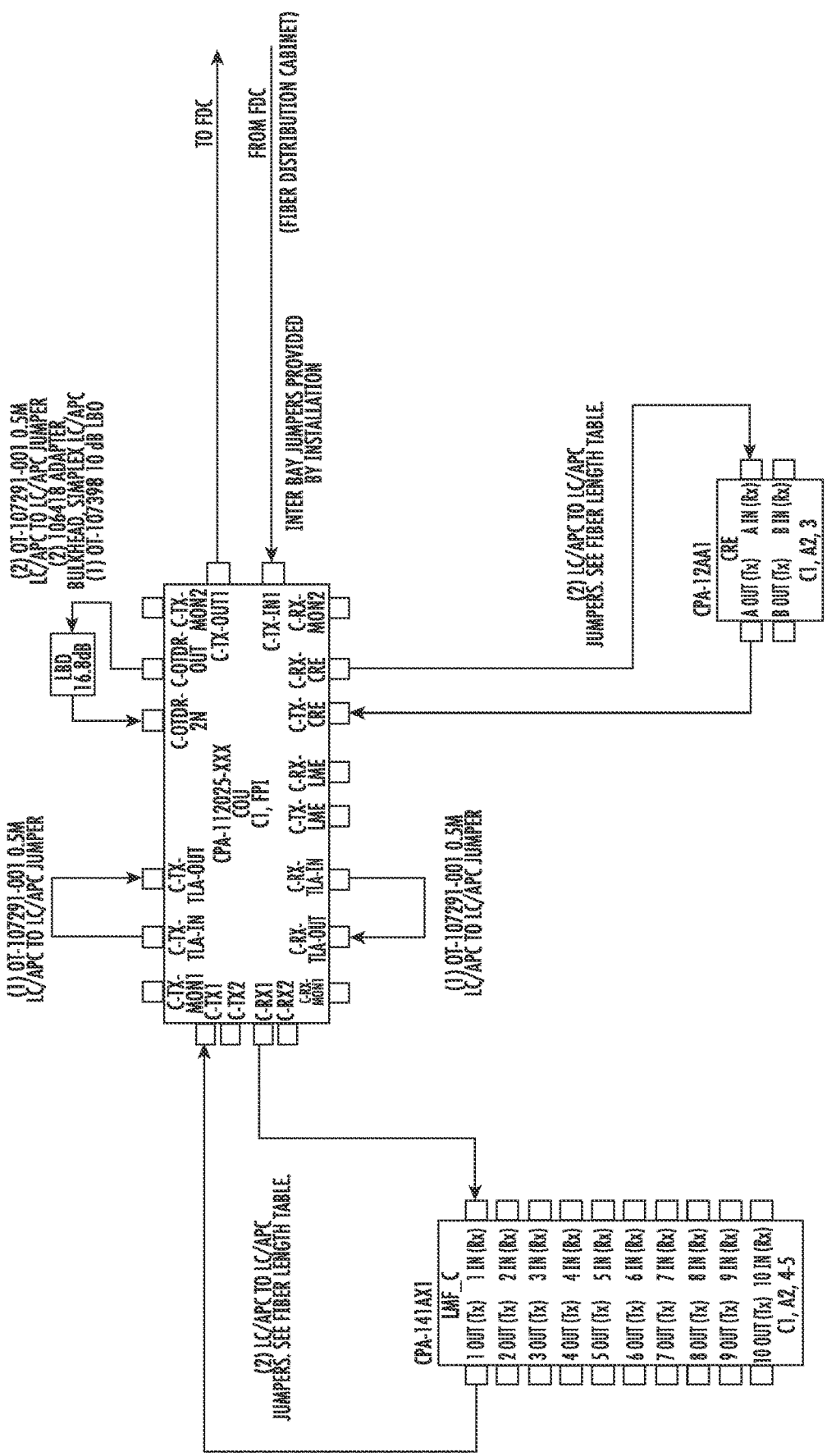
FIG. 3 illustrates a second example optical interconnection with a wet plant.

In some instance, when a fiber pair is dark and the generic terminal amplifier is not present or available, a different optical configuration may be required to enable higher launch power levels of the LME and CRE. FIG. 3, which figure illustrates an optical configuration 300, may be an example of this configuration.

FIG. 3 illustrates the example optical configuration 300 with a wet plant. As shown, the configuration 300 includes at least a COU, an LME coupled to one or more ports of the COU, and a CRE coupled to one or more ports of the COU.

In open cable systems, existing optical methods or configurations of bringing-up of generic terminal equipment on a fiber pair by connecting LME and CRE with the wet plant fiber pairs may be undesirable in some instances. It may be understood that an open cable system broadly refers to any system deployed without any terminal equipment except for COU, LME, and CRE.

For example, users or customers may prefer a clean demarcation point between an equipment provider or manufacturer (or service provider) generic SLTE equipment and the open cable equipment (COU, MI-PDP, LME, CRE). The users or customers may not want to run fibers back and forth between bay line ups that may exist in different terminal station locations. Further, the users or customers may not want to modify an initial dark fiber set-up to get a lit fiber configuration or change configurations for special LME measurements, such as Optical Time Domain Reflectometer (OTDR) measurements.

Suggestions for the clean demarcation may include either equipping the primary terminal line amplifiers with the Open Cable equipment (COU, MI-PDP, LME, CRE) and drawing a clean demarcation point on the SLTE side of the COU (or MI PDP) or finding a way to have LME and CRE access to the fiber pair without using the generic terminal equipment amplifiers (e.g., in effect accessing the fiber pair through couplers close to the wet plant).

A new concept is described herein that implements a different set of optics at the wet plant interface and a redesign of both the LME and CRE to better manage power level differences that may or will exist without using the generic terminal amplifiers that would be provided by a user or customer.

In various embodiments, an interface apparatus may include a plurality of fiber interface modules (FIM) that couple to respective optical fiber pairs of a subsea optical communications system, where each FIM includes a pair of normally closed switches. In various additional embodiments, in addition to the interface apparatus, an optical communications system may include a line monitoring equipment receive EDFA, as well as CRE transmit EDFA, as detailed herein below.

The new concept for connecting the modified LME and CRE to each open cable fiber pair is shown in and described with respect to at least the following figures. The interface module described herein preserves all the necessary functionality of the CRE and LME while advantageously solving one of the bigger issues present with making OTDR measurements once a fiber pair is lit.

Figure 4A:
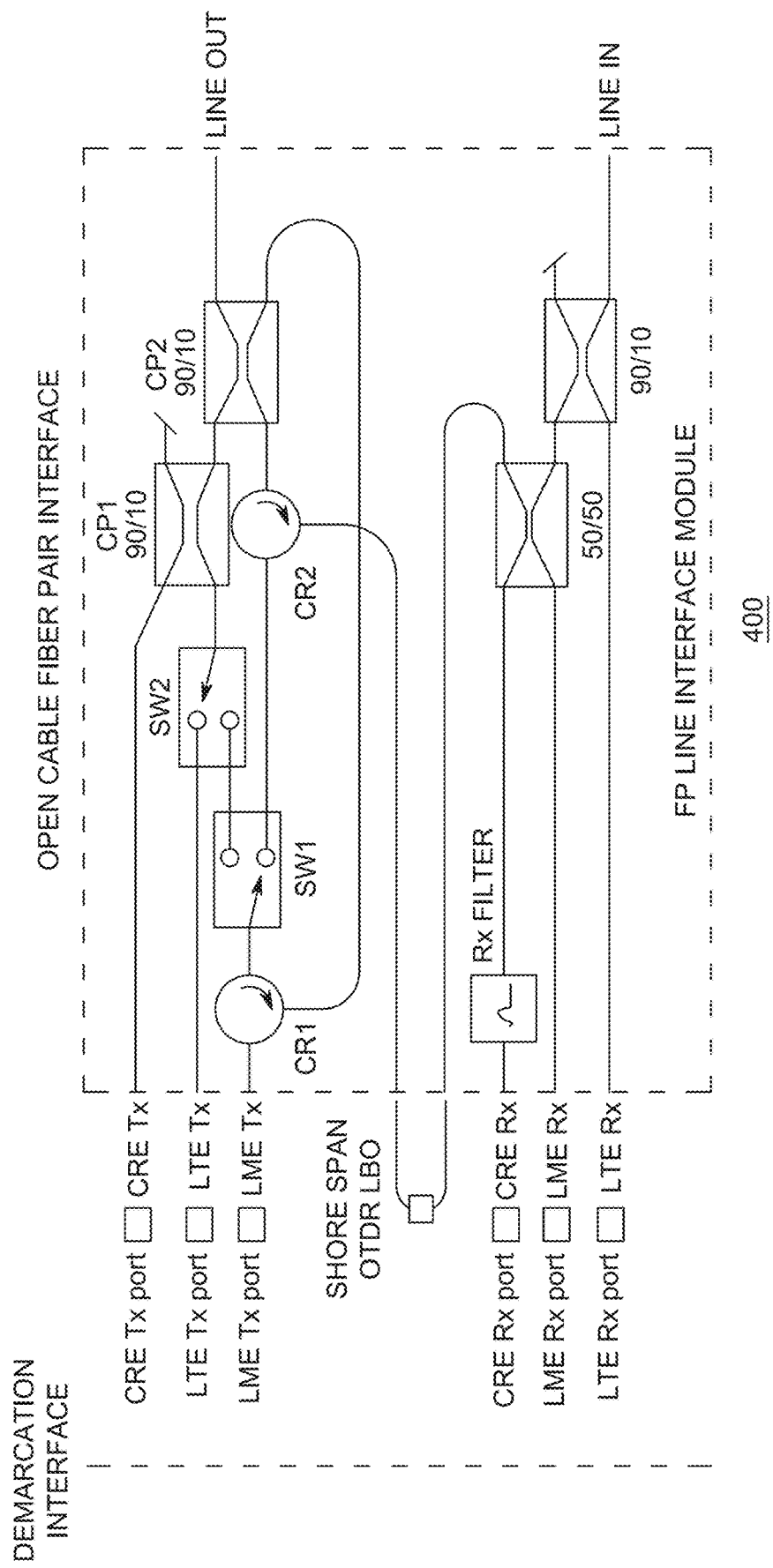
FIG. 4A illustrates a first example open cable fiber pair (FP) line interface module.

FIG. 4A illustrates an example open cable fiber pair (FP) line interface module (FIM) according to one or more embodiments. As will be further described below, the open cable FP line interface module, termed interface module 400, may be one of 12 or more fiber pair interface modules contained or included in a powered shelf. In a given FP line interface module according to the embodiment of FIG. 4A, a transmit part includes lines LME Tx line, LTE Tx line, and CRE Tx line, while a receive part includes lines LME Rx line, LTE Rx line, and CRE Tx line, where each of these lines in connected to a respective port (shown as boxes to the left of the figure), such as CRE Tx port, LME receive (Rx) port, and so forth.

In embodiments, each module may service one fiber pair and may contains two high-reliably, normally closed switches, shown as SW1 and SW2, as illustrated. The switch SW1 is coupled to the LME TX line, while the switch SW2 is coupled to the LTE TX line. A circulator CR1 and circulator CR2 may be provided as shown. A receive coupler, namely a CRE TX coupler CP1, is coupled to the switch SW1 and to a LME TX coupler CP2. The provided switching capability may at least accommodate both dark and lit fiber pair reconfiguration, and for making out-of-service OTDR measurements with an optimal LME-generated loading spectrum once a fiber pair is lit with the generic SLTE equipment.

The at least two switches allow at least load management in the dark fiber configuration where the output loss to the wet plant must be minimized. When a customer or user connects generic terminal equipment (and also no longer need LME loading), the module may be switched to connect LME to the wet plant through a coupler (e.g., 10 dB coupler).

Since LME and CRE may be redesigned for the interface module 400, no optical jumper changes may be needed. Further, there are no fiber jumpers going back and forth from the interface optics and the generic terminal amplifiers. Thus, a single demarcation point exits as shown in FIG. 4A.

In an alternate example, it may be understood that the alternate configuration would locate the CRE TX coupler between a circulator and outbound LME TX coupler so that the LTE TX outbound path may have less insertion loss.

For example, when a cable break occurs on a lit fiber pair, the optical switches in the interface module 400 may be automatically switched to block traffic (e.g., LTE traffic) while allowing the LME to provide the optimal loading power spectrum for the out of service OTDR measurement. Accordingly, and advantageously, users or customers no longer will have to reconfigure fibers for any LME measurements with the interface module 400 as shown and described above.

Figure 4B:
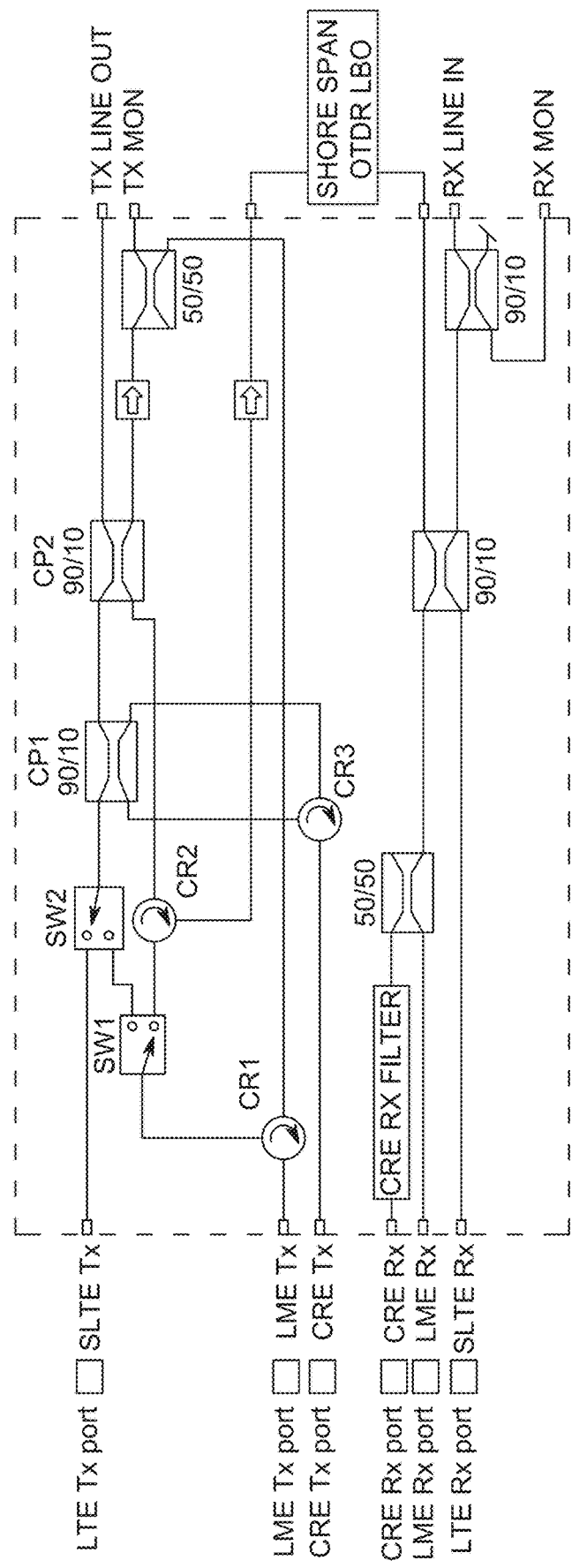
FIG. 4B illustrates a second example open cable fiber pair (FP) line interface module.
Figure 4C:
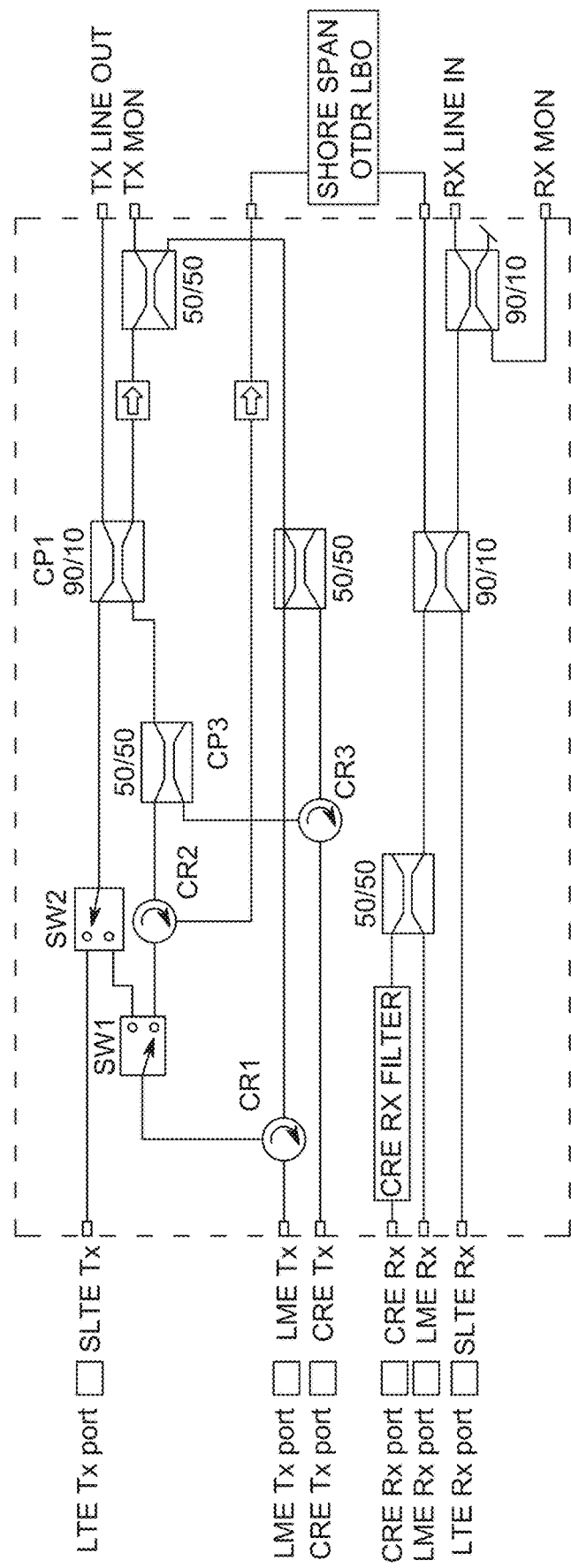
FIG. 4C illustrates a third example open cable fiber pair (FP) line interface module.

FIGS. 4B and 4C illustrate further examples of open cable fiber pair line interface modules, shown as interface module 420 and interface module 440 according to one or more embodiments. As shown, the various components and/or elements of the interface module 420 and interface module 440 may be configured or designed differently than the interface module 400 of FIG. 4A, while being able to achieve similar effects or functionalities of the interface module 400. As further shown, the interface module 420 and interface module 440 may also include or contain at least two switches similar to interface module 400. In the embodiment of FIG. 4B, in addition to the circulator CR1 and circulator CR2, a circulator CR3 is provided on the CRE Tx line, directly connected to the coupler CP1. In the embodiment of FIG. 4C, in addition to the circulator CR1 and circulator CR2, and circulator CR3, a coupler CP3 is provided between circulator CR2, circulator CR3, and the coupler CP1. It may be understood that other various configurations of the internal components etc. of the interface module 420 and interface module 440 are contemplated and not solely limited to just the design or configurations shown in FIGS. 4B and 4C.

Figure 4D:
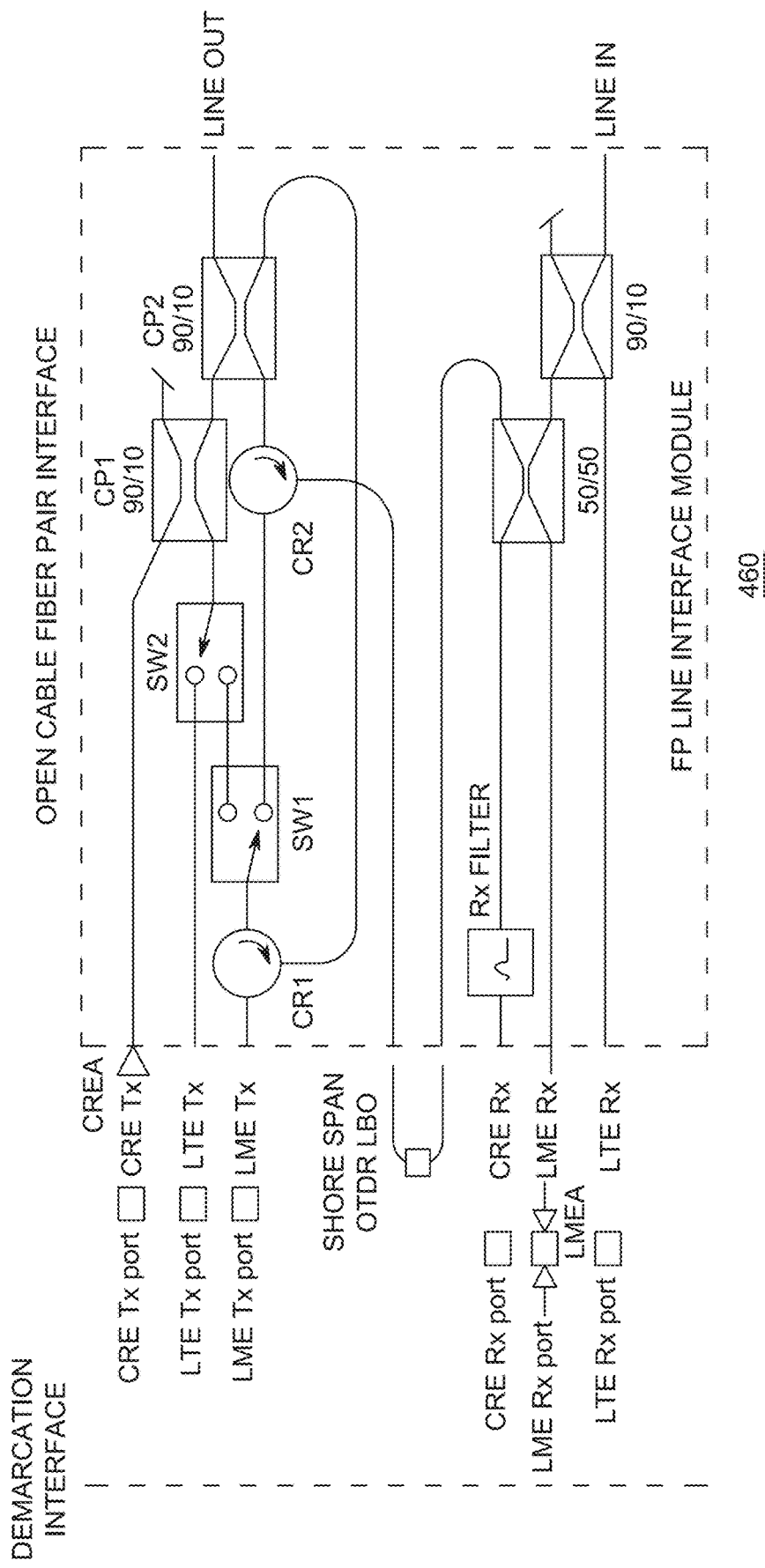
FIG. 4D illustrates a fourth example open cable fiber pair (FP) line interface module.

Note that in accordance with some embodiments, the aforementioned FIM modules may be implemented in an optical communication system in conjunction with the removal of terminal line amplifiers. For example, a for a G4 LME, a second "Receive" amplifier, such as an EDFA, may be added after the LME RX port selector switch to overcome the lack of RX power (e.g., arising from lack of RX TLA). Likewise, for the CRE, a "Transmit" amplifier, such as an EDFA, may be added in order to boost the TX signal power. FIG. 4D provides one such configuration, according to embodiments of the disclosure, where the interface module of FIG. 4A is supplemented in interface module 460 with a Receive amplifier, such as an EDFA (shown as LMEA), coupled between a LME receive port (shown as boxes to the left in the figure) and an LME receive coupler in the receive part, shown on line LME Rx. Similarly, the CRE Tx line is coupled to a transmit amplifier or EDFA (shown as CREA).

Figure 4E:
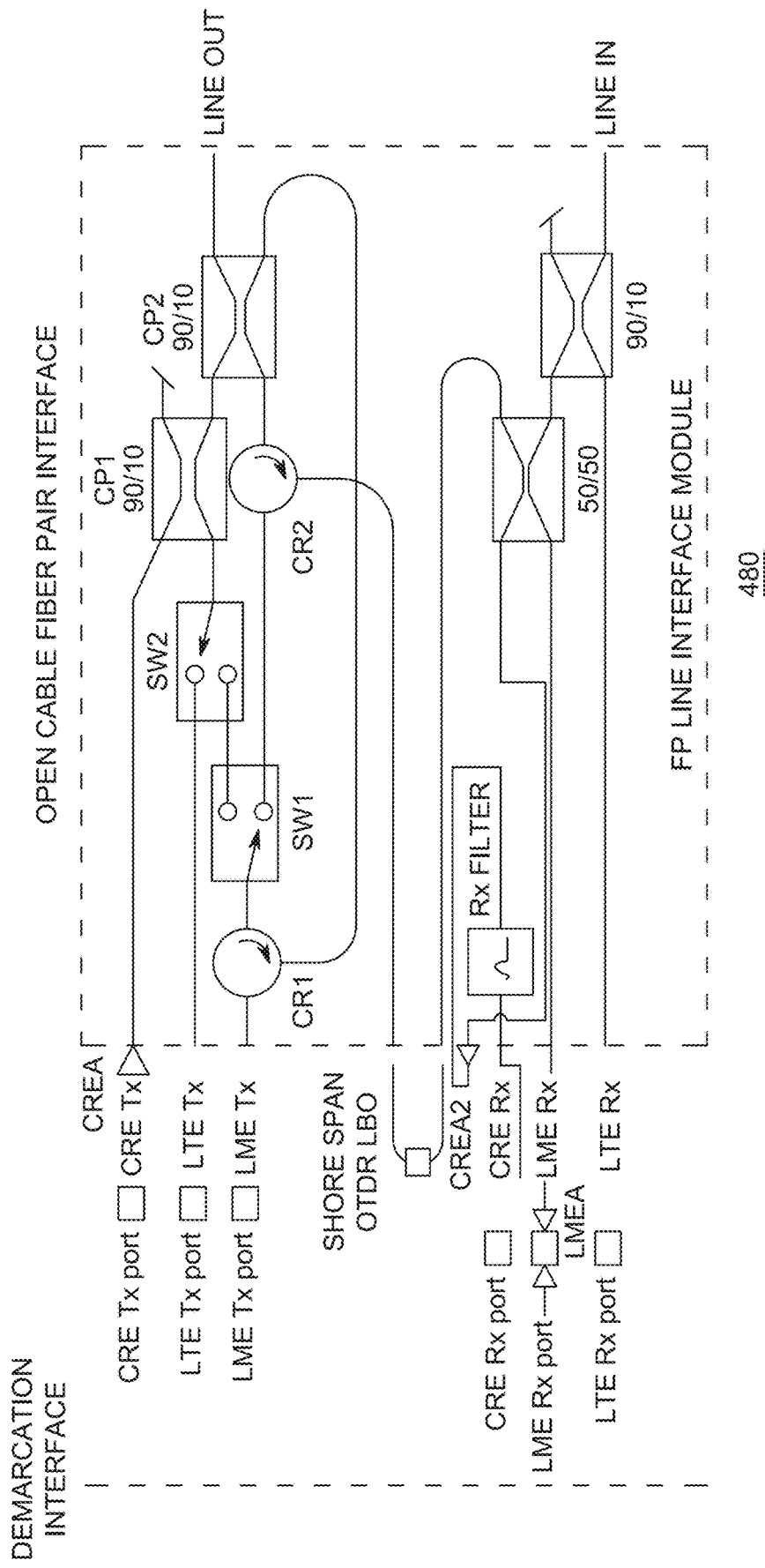
FIG. 4E illustrates a fifth example open cable fiber pair (FP) line interface module.

In additional embodiments of the disclosure, additional amplification or gain may be provided in or in conjunction with a fiber interface module. In some embodiments, an Rx side gain is added both for CRE Rx and LME Rx in alternate configurations, to address circumstances where more Rx side gain for returning LME or CRE signals is needed. When adding Rx EDFA in the CRE Rx path, a receive filter, shown as the single channel CRE Rx filter, may be situated after the inbound CRE RX EDFA. FIG. 4E illustrates one variant of this latter embodiment, where an open cable fiber pair (FP) line interface module, shown as interface module 480, is arranged as follows. An optical fiber exits the interface module 480, and couples to a CRE Rx EDFA, with a fiber then returning from the CRE Rx EDFA into the interface module 480 through the single channel CRE Filter, and the fiber then exiting the interface module 480 to a CRE Rx connection.

Figure 5:
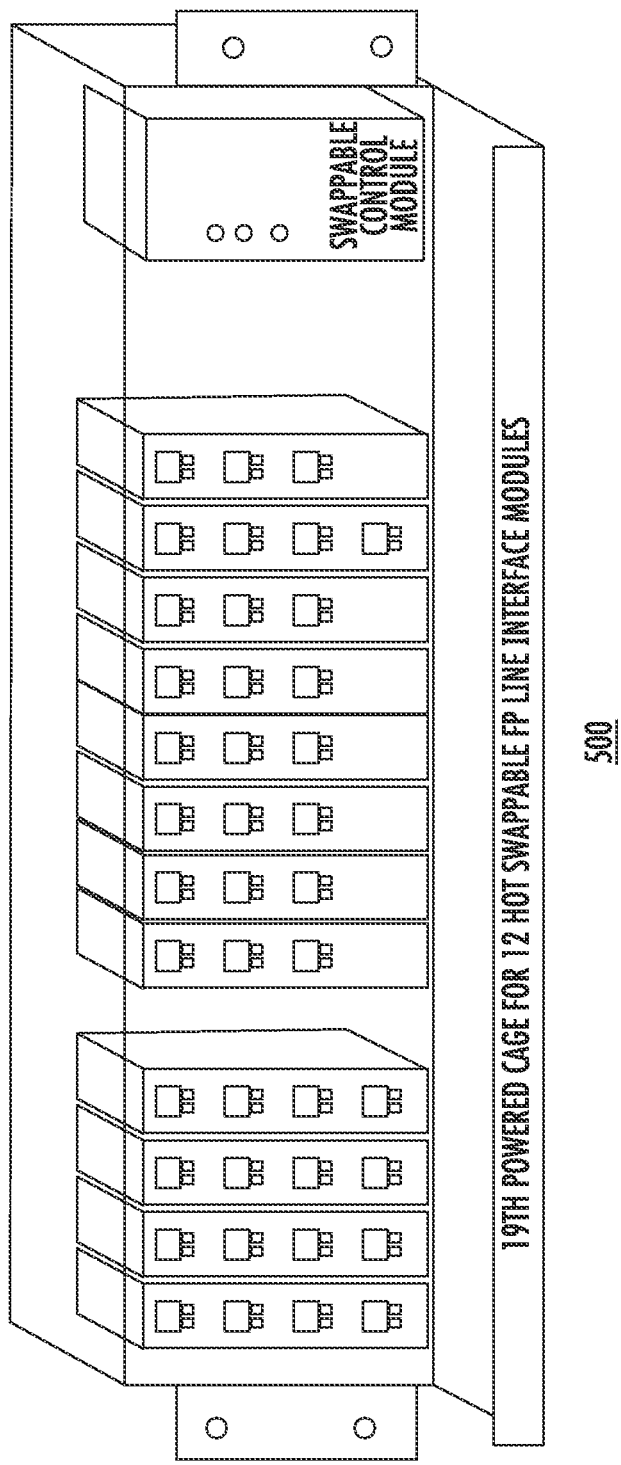
FIG. 5 illustrates an example cage for multiple FP line interface modules.

FIG. 5 illustrates an example powered cage or powered shelf 500 for multiple FP line interface modules or fiber interface modules (FIMs) according to one or more embodiments. For example, each of the interface modules may be configured similarly or identically to the interface module 400 of FIG. 4A, the interface module 420 of FIG. 4B, and/or the open cable FP line interface module 440 of FIB. 4C.

As shown, FIG. 5 is a physical realization of the FIMs by configuring, for example, a three or four rack unit (RU) tall 19-inch wide shelf for mounting in a standard 19-inch bay. The shelf may be powered and, while powered, does not dissipate significant heat since the switches need little power to operate.

Moreover, fans may not be needed. And modularity of the powered cage or shelf 500 may allow a single FIM to be equipped based on user/customer need or swapped out without taking out all fiber pairs in the event of a single FIM failure.

According to further embodiments, the FIMs may have a small backplane electrical connector allowing power and control pin connections. Moreover, a hot swappable power module may also be used or implanted with or in the cage or shelf 500, as also shown (as swappable control module) on the right side of FIG. 5. It may be understood that the configuration of FIG. 5 is not limiting and other physical packaging concepts, configurations, designs, etc. may be considered.

It may be understood that the above-described embodiments and examples, which may be implemented or included in an optical communication system, can be arranged in various and different arrangements and not be limited to any particular arrangement or in any other manner.

Herein, a novel and inventive techniques for a terminal line interface module for undersea open cable system access are disclosed. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. In particular, the present embodiments may specifically include: an apparatus, a module, a method, a system, an optical communication system component, at least one controller, at least one processor, at least one controller circuitry, and/or at least one non-transitory computer readable medium comprising one or more of the embodiments, features, examples, descriptions, etc. described above and herein and/or shown or illustrated in the Figures.

Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. An apparatus for managing an optical subsea communications system, comprising:
a plurality of fiber interface modules (FIM), wherein a given FIM comprises:
a receive part, comprising a line monitoring equipment (LME) RX line, line terminating equipment (LTE) RX line, command response equipment (CRE) RX line, a LME RX port, connected to the LME RX line, a LTE RX port, connected to the LTE RX line, and a CRE RX port, connected to the CRE RX line; and
a transmit part, the transmit part comprising a LME TX line, LTE TX line, and CRE TX line, a LME TX port, connected to the LME TX line, a LTE TX port, connected to the LTE TX line, and a CRE TX port, connected to the CRE TX line,
wherein the transmit part further comprises two normally closed switches, wherein a first switch of the two normally closed switches is coupled on a first side to the LME TX port, and is coupled on a second side to a first side of a second switch of the two normally closed switches,
and wherein the second switch of the two normally closed switches is coupled on a second side to the LTE TX port.

2. The apparatus of claim 1, wherein the plurality of FIM comprises at least twelve FIM.

3. The apparatus of claim 1, further comprising a receive amplifier and an LME receive coupler, the receive amplifier being coupled between the LME RX port and the LME receive coupler.

4. The apparatus of claim 1, further comprising a transmit amplifier, coupled to the CRE TX port.

5. The apparatus of claim 1, further comprising: a CRE TX coupler and a LME TX coupler, the CRE TX coupler being coupled to the second switch and to the LME TX coupler.

6. The apparatus of claim 5, further comprising a first circulator and a second circulator, coupled on opposite sides of the first switch, and a third circulator, coupled between the CRE TX coupler and the CRE TX port.

7. The apparatus of claim 6, further comprising a third coupler, disposed between the second circulator, the third circulator, and the CRE TX coupler.

8. The apparatus of claim 1, further comprising at least one hot swappable power module.

9. A subsea communications system, comprising:
a wet plant; and
an interface module assembly, coupled to the wet plant, the interface module assembly comprising:
a plurality of fiber interface modules (FIM), wherein a given FIM comprises:
a receive part, comprising a line monitoring equipment (LME) RX line, line terminating equipment (LTE) RX line, command response equipment (CRE) RX line, a LME RX port, connected to the LME RX line, a LTE RX port, connected to the LTE RX line, and a CRE RX port, connected to the CRE RX line; and
a transmit part, wherein the transmit part comprises two normally closed switches, the transmit part comprising a LME TX line, LTE TX line, and CRE TX line, a LME TX port, connected to the LME TX line, a LTE TX port, connected to the LTE TX line, and a CRE TX port, connected to the CRE TX line,
wherein a first switch of the two normally closed switches is coupled on a first side to the LME TX port, and is coupled on a second side to a first side of a second switch of the two normally closed switches,
and wherein the second switch of the two normally closed switches is coupled on a second side to the LTE TX port.

10. The subsea communications system of claim 9, wherein the plurality of FIM comprises at least twelve FIM.

11. The subsea communications system of claim 9, further comprising a receive amplifier and an LME receive coupler, the receive amplifier being coupled between the LME RX port and the LME receive coupler.

12. The subsea communications system of claim 9, further comprising a transmit amplifier, coupled to the CRE TX port.

13. The subsea communications system of claim 12, further comprising: a CRE TX coupler and a LME TX coupler, the CRE TX coupler being coupled to the second switch and to the LME TX coupler.

14. The subsea communications system of claim 12, further comprising a first circulator and a second circulator, coupled on opposite sides of the first switch, and a third circulator, coupled between the CRE TX coupler and the CRE TX port.

15. The subsea communications system of claim 14, further comprising a third coupler, disposed between the second circulator, the third circulator, and the CRE TX coupler.

16. The subsea communications system of claim 9, wherein the interface module assembly comprises at least one hot swappable power module.

17. A subsea communications system, comprising:
a wet plant;
an interface module assembly, coupled to the wet plant, the interface module assembly comprising:
a plurality of fiber interface modules (FIM), wherein a given FIM of the plurality of FIM comprises:
a receive part, comprising an line monitoring equipment (LME) RX line, line terminating equipment (LTE) RX line, command response equipment (CRE) RX line, a LME RX port, connected to the LME RX line, a LTE RX port, connected to the LTE RX line, and a CRE RX port, connected to the CRE RX line;
a transmit part, the transmit part comprising a LME TX line, LTE TX line, and CRE TX line, a LME TX port, connected to the LME TX line, a LTE TX port, connected to the LTE TX line, and a CRE TX port, connected to the CRE TX line,
wherein the transmit part comprises two normally closed switches,
wherein a first switch of the two normally closed switches is coupled on a first side to the LME TX port, and is coupled on a second side to a first side of a second switch of the two normally closed switches,
and wherein the second switch of the two normally closed switches is coupled on a second side to the LTE TX port; and
at least one amplifier, coupled to a port of the given FIM.

18. The subsea communications system of claim 17, wherein the at least one amplifier comprises a receive amplifier and an LME receive coupler, the receive amplifier being coupled between the LME RX port and LME receive coupler.

19. The subsea communications system of claim 17, wherein the at least one amplifier comprises a transmit amplifier, coupled to the CRE TX port.

20. The subsea communications system of claim 17, wherein the at least one amplifier comprises a CRE Rx EDFA, wherein the receive part comprises a receive coupler and a receive filter, the CRE Rx EDFA being coupled between the receive coupler and the receive filter.

* * * * *